J. J. BUKOLT.
TIRE ARMOR.
APPLICATION FILED AUG. 8, 1912.
1,061,524.  Patented May 13, 1913.
3 SHEETS—SHEET 1.
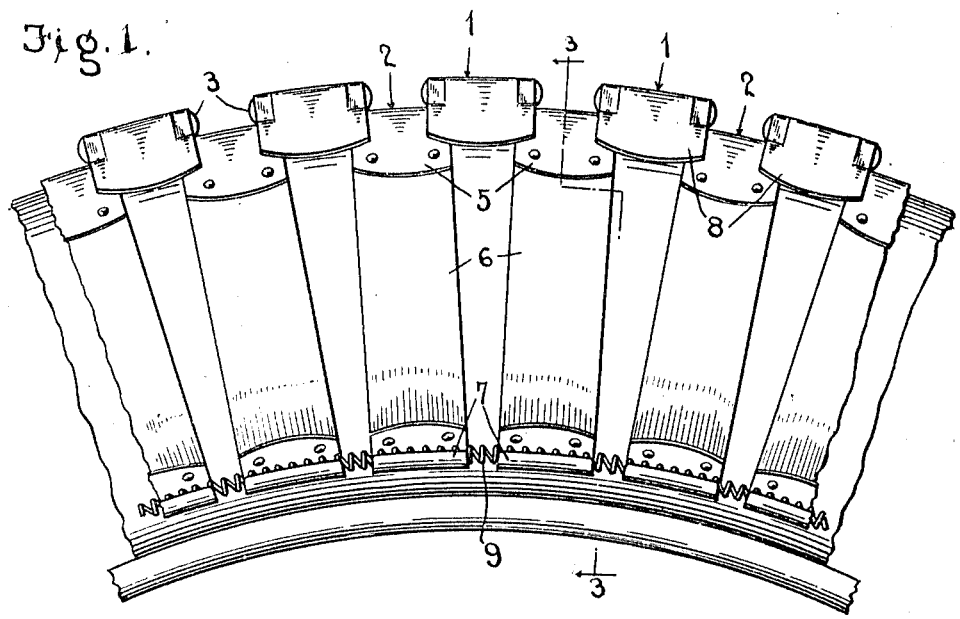
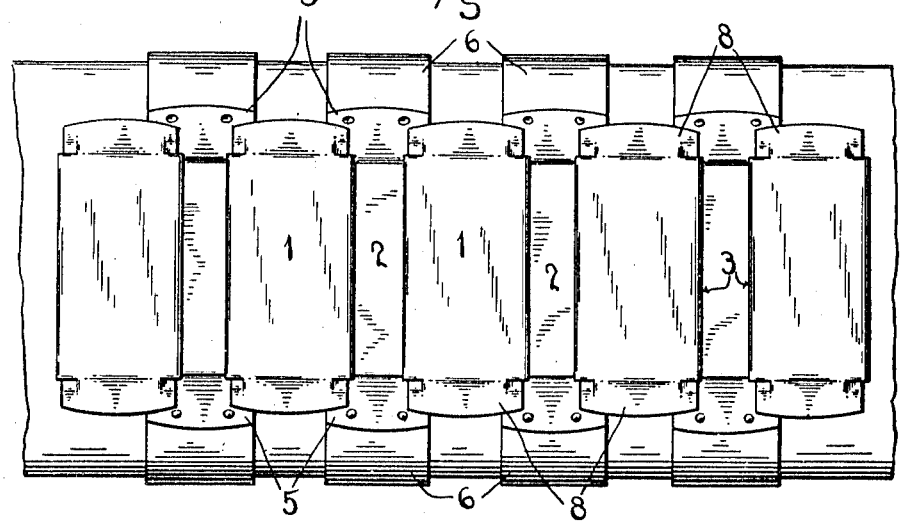
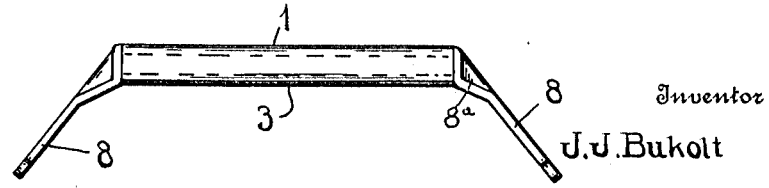
Witnesses
L. B. James
S. M. McColl
Inventor
J. J. Bukolt
By H. B. Willson & Co.
Attorneys

J. J. BUKOLT.
TIRE ARMOR.
APPLICATION FILED AUG. 8, 1912.

1,061,524.

Patented May 13, 1913.
2 SHEETS—SHEET 2.

Witnesses
L. B. James
L. M. McColl

Inventor
J. J. Bukolt
By H. B. Wilson &co
Attorneys

UNITED STATES PATENT OFFICE.

JOHN J. BUKOLT, OF STEVENS POINT, WISCONSIN.

TIRE-ARMOR.

1,061,524.

Specification of Letters Patent.

Patented May 13, 1913.

Application filed August 8, 1912. Serial No. 714,045.

*To all whom it may concern:*

Be it known that I, JOHN J. BUKOLT, a citizen of the United States, residing at Stevens Point, in the county of Portage and State of Wisconsin, have invented certain new and useful Improvements in Tire-Armors; and I do declare the following to be a full, clear, and exact description of the invention, such as will enable others skilled in the art to which it appertains to make and use the same.

This invention relates to improvements in tire armors or protectors.

The object of the invention is to provide a tire armor which is noiseless when applied and which thoroughly protects the tread of the wheel against puncture.

Another object of the invention is to provide a tire armor which may be quickly and readily adjusted and which may be easily repaired should one of the sections become worn or loose.

With these and other objects in view, the invention consists of certain novel features of construction, combination and arrangement of parts, as will be hereinafter described and claimed.

Figure 3:
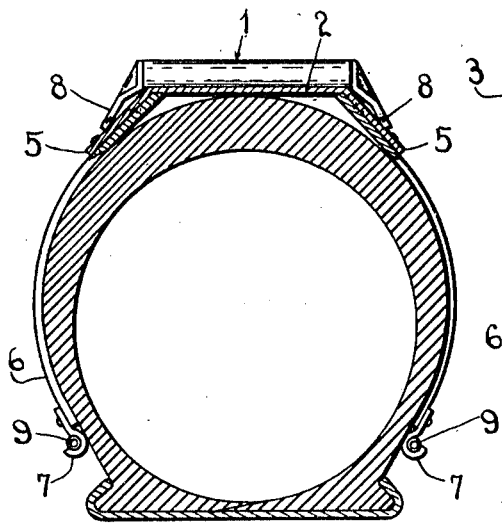
Figure 4:
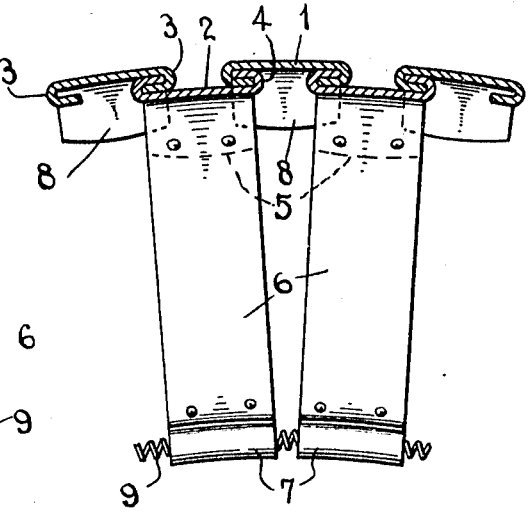
Figure 5:
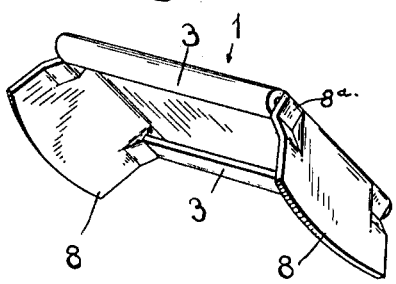
Figure 6:
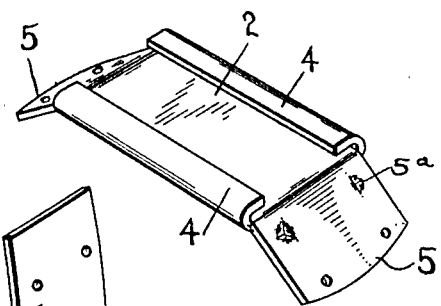
Figure 7:
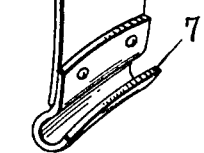

In the accompanying drawings:—Figure 1 represents a side elevation of a portion of a tire equipped with this improved armor; Fig. 2 is a plan view thereof; Fig. 3 is a transverse vertical section, taken on the line 3—3 of Fig. 1; Fig. 4 is a longitudinal section through the treadplates; Fig. 5 represents a detail perspective view of one of the outer tread plates; Fig. 6 is a similar view of one of the inner tread plates; and Fig. 7 is a similar view of one of the connecting strips. Fig. 8 is a detail of the outer member.

In the embodiment illustrated, the tread portion of the armor is composed of a plurality of outer tread plates 1 which alternate with inner tread plates 2, which are hooked together to form a double joint and an absolutely solid steel tread, through which it is impossible for a tack or any article to pass. As shown, these outer plates 1 have their opposite ends bent inwardly to form hooks 3 and the inner plates are similarly bent to form hooks 4, with which the hooks 3 of the outer plates are engaged, as shown clearly in Fig. 4. This connection of the inner and outer plates forms a flexible tread surface and one which is impervious to puncture. These inner plates 2 are provided at their side edges with lips 5 bent to conform to the curvature of the tire and to which connecting straps 6 are secured. These straps 6 are composed of any suitable flexible material, preferably of leather, and are secured by riveting or otherwise at one end to the lips 5 and their outer ends are provided with hooks as 7 for a purpose to be described. The lips 5 are preferably provided on their outer faces with indentations $5^a$ which form spurs $5^b$ on the lower faces of the lips to engage the straps 6 and assist the connecting rivets in holding them against lateral movement. The outer plates 1 are also provided at their opposite edges with inwardly turned aprons 8, which are bent at an obtuse angle and designed to retain the tire in a rut or deep wheel track to prevent twisting of the vehicle. These aprons 8 are provided at their opposite side edges adjacent their connection with their respective plates with indentations $8^a$ for closely positioning the inbent portion relative to the ends of the flanges thereof whereby the plates 1 are locked against lateral movement and the joint between them and plates 2 protected against the entrance of mud and dust.

The connecting straps 6 are connected together and held in operative position by resilient annular members 9, here shown in the form of coiled springs which engage the tire near its connection with the wheel rim and with which the hooks 7 of the straps 6 are engaged as is shown clearly in Fig. 3. These resilient retaining members 9 hold each section of the armor in place in close relation to the tire and yet permit said armor to yield when the tire is inflated, and when the tire is fully inflated the armor is held by said springs absolutely tight on the tire. Should the armor become stretched or loosened for any reason one section, comprising an inner plate 2 and an outer plate 1 together with the connecting straps attached to said inner plate may be readily removed by unhooking them from adjacent plates and by disengaging the hooks 7 from the retaining members 9. The other plates of the tread portion are then hooked together and the tire armor tightened to the proper degree. It will thus be obvious that the members 9 form tensioning devices for the armor sections, the ends of said elements being detachably connected to provide for their lengthening and shortening as may be desired to fit tires of different circumferences.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as claimed.

I claim as my invention:

1. A tire armor comprising a tread portion composed of a plurality of alternately arranged inner and outer plates having hooks at the opposite ends thereof, the hooks of the outer plates being engaged with those of the inner plates, said inner plates being provided at their opposite side edges with lips, flexible straps secured to said lips, and yielding means for detachably connecting said straps.

2. A tire armor comprising a plurality of alternately arranged inner and outer plates flexibly connected, flexible straps secured to the side edges of one series of said plates and provided with hooks at their free ends, and resilient annular members engaged with said hooks for detachably connecting the straps and for securing the armor to a tire.

3. A tire armor comprising a plurality of alternately arranged inner and outer plates having interlocking hooks at their ends, said inner plates having laterally extending lips projecting from their side edges, flexible straps secured at one end to said lips and provided at their free ends with hooks, and annular coiled springs detachably engaged with the hooks of said straps.

4. A tire armor comprising a plurality of alternately arranged inner and outer plates having interlocking hooks at their ends, said inner plates having laterally extending lips projecting from their side edges, flexible straps secured at one end to said lips and provided at their free ends with hooks, and annular coiled springs detachably engaged with the hooks of said straps, said outer plates having laterally extending aprons on their side edges set at an angle thereto.

5. A tire armor composed of a tread section comprising outer members each having a substantially rectangular body with inturned hooks along its front and rear ends and inturned sides standing over the extremities of said hooks, and inner members each having a flat rectangular body with outturned hooks along its front and rear ends adapted to engage those on the outer members and stand between the sides of the latter, and lips along its opposite sides combined with attaching means engaging said lips for holding the tread section on the tire.

6. A tire armor composed of a tread section comprising outer members each having a substantially rectangular body with inturned hooks at its opposite ends and inturned sides standing over the extremities of said hooks and inner members each having a flat rectangular body with outturned hooks on its opposite ends adapted to engage those on the outer members and stand between the sides of the latter, and lips deflected from the plane of the body toward the axis of the wheel; combined with flexible members connected with said lips, and means for clamping said members on the exterior of the tire.

7. A tire armor comprising a plurality of alternately arranged inner and outer plates having interlocking hooks at their ends, said inner plates having laterally extending lips projecting from their side edges, flexible straps secured at one end to said lips and provided at their free ends with hooks, and annular coiled springs detachably engaged with the hooks of said straps, said outer plates having laterally extending beveled aprons on their side edges provided with means for protecting the ends of the joints between the plates.

8. A tire armor comprising a plurality of alternately arranged inner and outer plates having interlocking hooks at their ends, said inner plates having laterally extending lips projecting from their side edges, flexible straps secured at one end to said lips and provided at their free ends with hooks, and annular coiled springs detachably engaged with the hooks of said straps, said outer plates having laterally extending inwardly deflected aprons on their side edges, said aprons being inbent at their bases to lock them against lateral movement and to protect the joints between the plates.

9. A tire armor comprising a plurality of alternately arranged inner and outer plates having interlocking hooks at their ends, said inner plates having laterally extending lips projecting from their side edges, flexible straps secured at one end to said lips and provided at their free ends with hooks, and annular coiled springs detachably engaged with the hooks of said straps, said outer plates having laterally extending inwardly deflected aprons on their side edges, said aprons having indentations at their bases adjacent their side edges.

In testimony whereof I have hereunto set my hand in presence of two subscribing witnesses.

JOHN J. BUKOLT.

Witnesses:
T. L. N. PORT,
A. T. GRANT.